April 7, 1931. J. KRÖS 1,799,911
ARRANGEMENT FOR SEARCHLIGHT LAMPS
Filed Aug. 22, 1928
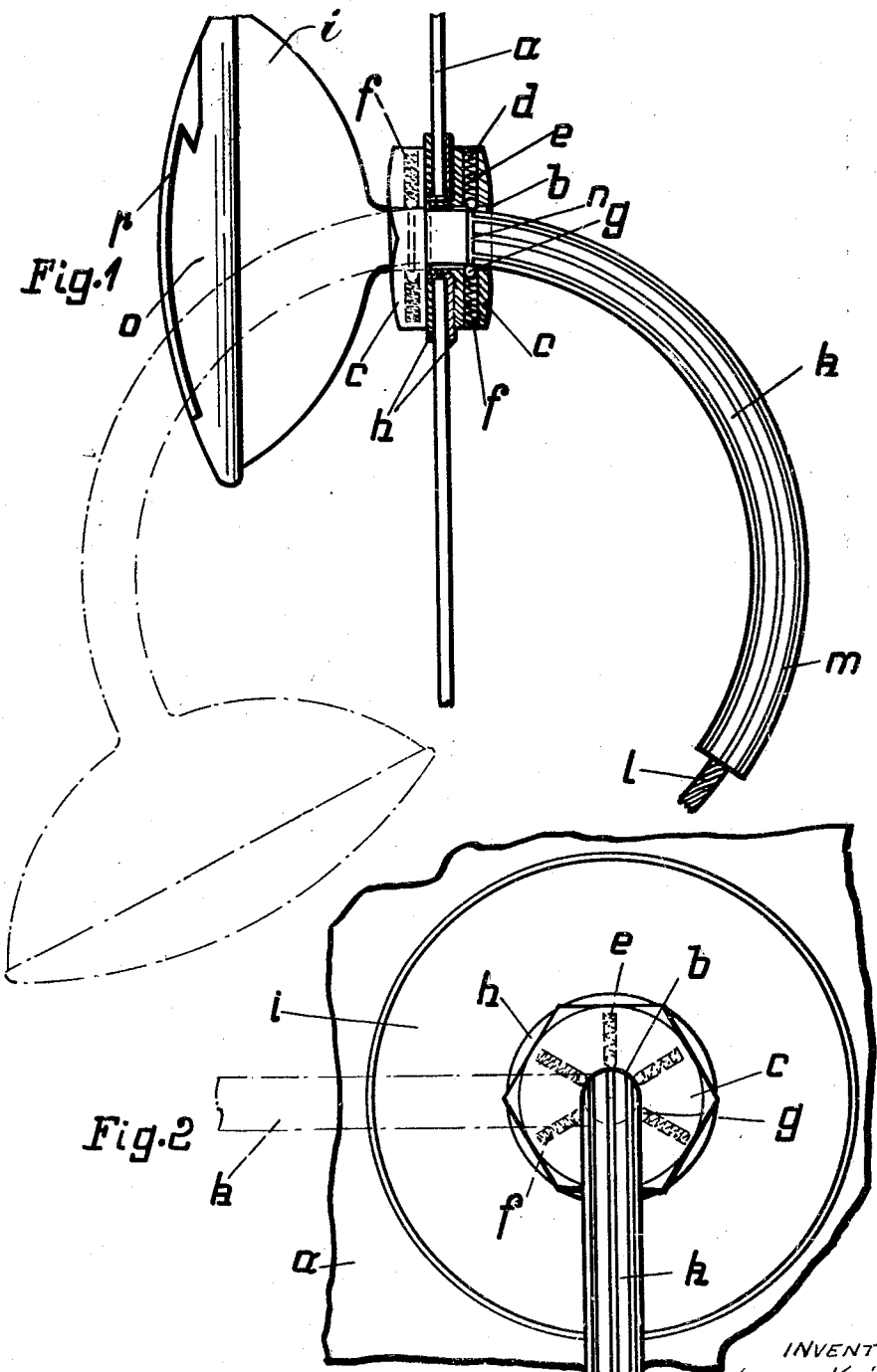
INVENTOR
JOSEF KRÖS
BY
ATTORNEYS Patented Apr. 7, 1931

1,799,911

UNITED STATES PATENT OFFICE

JOSEF KRÖS, OF FRANKFORT-ON-THE-MAIN, GERMANY

ARRANGEMENT FOR SEARCHLIGHT LAMPS

Application filed August 22, 1928, Serial No. 301,199, and in Germany July 12, 1927.

This invention relates to improvements in lamps and mountings therefor, and has particular reference to a lamp of the type known as hand searchlights.

An object of the invention is to provide an improved mounting of simple and practical construction especially adapted for use on automobiles and by means of which a lamp may be supported in various angular positions relative to the mounting and may be withdrawn therefrom so as to be used at various points in and about a motor vehicle.

Another object is to provide a mounting which can be suitably attached to the wind-shield of an automobile or any other convenient place and which will receive a support for a lamp, the support consisting of a curved tube received in the mounting in such manner that the lamp can be adjusted to shine in various directions, can be frictionally maintained in such positions, or can be entirely withdrawn from the mounting and readily replaced in position therein.

The above and other objects will appear more clearly from the following description when taken in connection with the accompanying drawing which illustrates a preferred embodiment of the inventive idea.

In the drawing—

Figure 1 is a side elevation, partly in section, of a lamp and its mounting constructed in accordance with the invention; and Figure 2 is a front elevation thereof.

The lamp, for example, may be supported directly on the wind-shield $a$ of a motor vehicle in which instance the complemental members of the mounting in the form of disks $c$ would be placed on opposite sides of an opening in the wind-shield and provided with apertures $b$ for a purpose which will presently appear. To secure the disks together the same are provided with interengaging screw-threaded flanges $d$ and between said disks and the wind-shield are interposed the washers $h$ of suitable material such as rubber.

The lamp $i$ to be supported in the mounting is provided with a curved arm $k$ which is insertable into and adapted to be withdrawn from the openings $b$ in the disks and through this arm there is passed a cable $l$ carrying the conductors for the lamp, said cable being of any desired length which will enable the transposition of the lamp to various places in and about the vehicle. The curved arm is provided with a plurality of longitudinal grooves $m$ and also a circumferential groove $n$ at its inner end, the purpose of which will presently appear.

In each of the disks $c$ there are formed a number of radial bores $e$ in each of which is disposed a spring pressed-ball bearing $g$ the inward movement of which is limited by a slight tapering of the inner end of the bore but which will project sufficiently therefrom to engage in the grooves $m$ and $n$. These bearings form an anti-friction guide for the curved arm and at the same time have sufficient pressure applied to them by the springs when engaged in said grooves, to frictionally maintain the lamp in various adjusted positions against the vibrations of the vehicle, when running.

When the lamp is in the full line position of Figure 1, the bearings engage in the groove $n$ and the lamp may be rotated by turning the arm $k$ for the purpose of altering the position of the direction-indicating arrow $p$ on the lens $o$ of the lamp. Should it be desired to change the direction of the light beams from the lamp, the arm $k$ may be grasped and pushed outwardly through the openings in the mounting disks to the dotted line position of Figure 1 or any other desired intermediate position, whereupon the bearings $g$ will engage in the grooves $m$. The arm $k$ may also be turned when wholly or partially extended to throw the light in an upward, downward or lateral direction and in any position of adjustment the bearings $g$ will frictionally maintain the lamp in such position. The curvature of the arm $k$ may be made such that when the same is fully extended, but still within the mounting, as indicated in dotted lines in Figure 1, the light will be cast backwards through the windshield, thus giving the driver of the vehicle an opportunity to utilize the light for various purposes without having to leave his seat. Further, the lamp and its arm may be entirely withdrawn from the mounting and transported to distances from the wind-shield depending upon the length of the cable *l*.

What is claimed is:

1. In combination, a mounting capable of attachment to the wind-shield of an automobile, a lamp, a curved arm for said lamp extending through said mounting and having both rotatable and linear adjustments relative thereto, and means for guiding said lamp support in its movement of adjustment.

2. In combination, a mounting capable of attachment to the wind-shield of an automobile, a lamp, a curved arm for said lamp extending through said mounting and having both rotatable and linear adjustments relative thereto, said arm having longitudinal and circumferential grooves, and spring pressed bearings carried by said mounting and engageable in said grooves.

3. In combination, a mounting including complemental disks capable of attachment to the wind-shield of an automobile and having openings therein, each disk also having a plurality of bores, spring pressed bearings in said bores and projecting into the opening in the disk, a lamp, and a curved arm for said lamp extending through said openings and having both linear and rotatable movements relative thereto, said arm having longitudinal and circumferential grooves therein in which said bearings are engageable.

In testimony whereof I affix my signature.

JOSEF KRÖS.